United States Patent
Kao et al.

(10) Patent No.: US 7,779,403 B2
(45) Date of Patent: Aug. 17, 2010

(54) METHOD AND SYSTEM FOR DISCOVERING COMMUNICATION DEVICE CAPABILITIES

(75) Inventors: Huan-Ming Kao, Taipei (TW);
Hsuan-Hao Chen, Taipei County (TW)

(73) Assignee: Institute for Information Industry, Taipei (TW)

(*) Notice: Subject to any disclaimer, the term of this patent is extended or adjusted under 35 U.S.C. 154(b) by 1161 days.

(21) Appl. No.: 11/402,866

(22) Filed: Apr. 13, 2006

(65) Prior Publication Data

US 2007/0130331 A1    Jun. 7, 2007

(30) Foreign Application Priority Data

Nov. 22, 2005    (TW) ............... 94140953 A

(51) Int. Cl.
*G06F 9/44* (2006.01)

(52) U.S. Cl. ............ 717/169; 717/171; 717/172; 717/173; 717/174; 709/203; 709/205; 707/625

(58) Field of Classification Search ......... 717/168–169, 717/171–174; 715/739; 709/225
See application file for complete search history.

(56) References Cited

U.S. PATENT DOCUMENTS

| | | | | |
|---|---|---|---|---|
| 5,390,301 A * | 2/1995 | Scherf | ............ | 719/321 |
| 6,035,297 A * | 3/2000 | Van Huben et al. | ......... | 707/695 |
| 6,247,135 B1 * | 6/2001 | Feague | ............ | 713/400 |
| 6,493,702 B1 * | 12/2002 | Adar et al. | ............ | 707/706 |
| 6,836,657 B2 * | 12/2004 | Ji et al. | ............ | 455/419 |
| 7,096,311 B2 * | 8/2006 | Chiang | ............ | 711/100 |
| 7,350,205 B2 * | 3/2008 | Ji | ............ | 717/172 |
| 7,366,824 B2 * | 4/2008 | Chiang | ............ | 711/100 |
| 2004/0249915 A1 * | 12/2004 | Russell | ............ | 709/223 |
| 2005/0086270 A1 * | 4/2005 | Shimizu et al. | ............ | 707/200 |
| 2005/0246415 A1 * | 11/2005 | Belfiore et al. | ............ | 709/203 |
| 2006/0041556 A1 * | 2/2006 | Taniguchi et al. | ............ | 707/10 |
| 2006/0206537 A1 * | 9/2006 | Chiang | ............ | 707/200 |
| 2007/0013560 A1 * | 1/2007 | Casey | ............ | 340/995.19 |
| 2007/0015519 A1 * | 1/2007 | Casey | ............ | 455/456.2 |
| 2007/0094672 A1 * | 4/2007 | Hayton et al. | ............ | 719/315 |
| 2008/0140705 A1 * | 6/2008 | Luo | ............ | 707/103 R |
| 2009/0300509 A1 * | 12/2009 | Mathew et al. | ............ | 715/739 |

OTHER PUBLICATIONS

Title: A varying per user profile based location update strategy for cellular networks, author: Dasbit et al, source: IEEE, publication date: 2000.*
Title: Automatic device configuration and data validation through mobile communication, author: Cheung et al, source: IEEE, publication date: 2003.*

* cited by examiner

*Primary Examiner*—Chameli C Das
(74) *Attorney, Agent, or Firm*—Birch, Stewart, Kolasch & Birch, LLP

(57) ABSTRACT

A method for discovering capabilities of a communication device, including updating the capabilities of the communication device, generating update information corresponding to the communication device after updating the capabilities of the communication device, and transferring the URL of user agent profile and the update information of the communication device to a first server, when the communication device connects to the Internet.

27 Claims, 5 Drawing Sheets

METHOD AND SYSTEM FOR DISCOVERING COMMUNICATION DEVICE CAPABILITIES

CROSS-REFERENCE TO RELATED APPLICATIONS

This application claims priority to Application No. 94140953 filed in Taiwan on Nov. 22, 2005 under 35 U.S.C. §119(a).

BACKGROUND OF THE INVENTION

1. Field of the Invention

The invention relates to a communication device management system, and in particular collection method of a communication device management system with a dynamic capability.

2. Description of the Related Art

FIG. 1 is a schematic view of a conventional data path for upgrading a communication device 10. The capabilities of the communication device 10 are determined when fabricated. A User Agent Profile (UAProf) describing capabilities of communication device 10 is stored in a database 16 of a second server 15. Most of the second servers 15 are set up by the factories that manufacture the communication device 10. The UAProf stored in the database 16 of the second server 15 comprises the initial software/hardware capabilities of the communication device 10.

When a user wants to surf the internet, a built-in browser 11 of the communication device 10 has to transfer URL of the UAProf to a first server 13 through the internet 12. When the URL of the UAProf is received by the first server 13, a request for the content of the UAProf is sent to the second server 15. Most first servers 13 are configured by a Telecommunication Company which provides services to users.

In addition, if the communication device 10 transfers both the URL of the UAProf and a User Agent Profile Difference (UAProf-Diff) to the first server 13, the first server 13 will send a request to the second server 15 to obtain the content of the UAProf according to URL of the UAProf, and combine the UAProf and UAProf-Diff to update the UAProf of the communication device 10. UAProf-Diff may be the difference between various types of communication devices of the same brand. In addition, the UAProf-Diff can be pre-stored in the communication device 10 when fabricated.

To enhance performance, first server 13 stores correct UAProfs corresponding to each user in a database 14 of the first server 13 in order to reduce the time required to request the UAProf content from the second server.

When a user uses a built-in browser 11 of communication device 10 to access on-line services through internet 12, information server 17 provides data or format transformed data to communication device 10 according to the correct UAProf stored in database 14 of first server 13. In addition, data provided by information server 17 can be the contents of web pages or files.

Under conventional architecture, a communication device can only transfer the URL of the UAProf and UAProf-Diff stored in the communication device when fabricated to the server that is set up by a Telecommunication Company. Due to the ability to enhance the capabilities of a communication device, the capabilities of the communication device may vary. The capabilities of the communication device can be changed through updating software or adding pluggable accessories such as a camera module, a TV receiver and a portable keyboard, but the servers set up by Telecommunication Company have no idea about changes to the communication device after fabrication. When a user uses the built-in browser of the communication device to access on-line services through the Internet, the servers set up by Telecommunication Company can only send a request to the information server for additional information according to the original capabilities. Therefore, the information provided by the information server may not be the expected information.

BRIEF SUMMARY OF INVENTION

A detailed description is given in the following embodiments with reference to the accompanying drawings.

Methods and systems for discovering capabilities of communication devices are provided. An embodiment of a method for discovering capabilities of a communication device comprising updating the capabilities of the communication device, generating an update updating information corresponding to the communication device after updating the capabilities of the communication device, and transferring the URL of user agent profile and the updated information of the communication device to a first server when the communication device is connected to the Internet.

An embodiment of a communication device capability management system; comprises a communication device, comprising: URL of a user agent profile; a capability management agent generating an information update corresponding to the capabilities of the communication device after updating the communication device when the capabilities of the communication device have been updated; and a download agent downloading software for updating the communication device, and a first server sending a request to a second server for the user agent profile according to the URL of the user agent profile, comparing the user agent profile and the information update, and updating the user agent profile for describing the software/hardware capabilities of the communication device after being updated.

BRIEF DESCRIPTION OF DRAWINGS

The present invention can be more fully understood by reading the subsequent detailed description and examples with references made to the accompanying drawings, wherein.

DETAILED DESCRIPTION OF INVENTION

Figure 1:
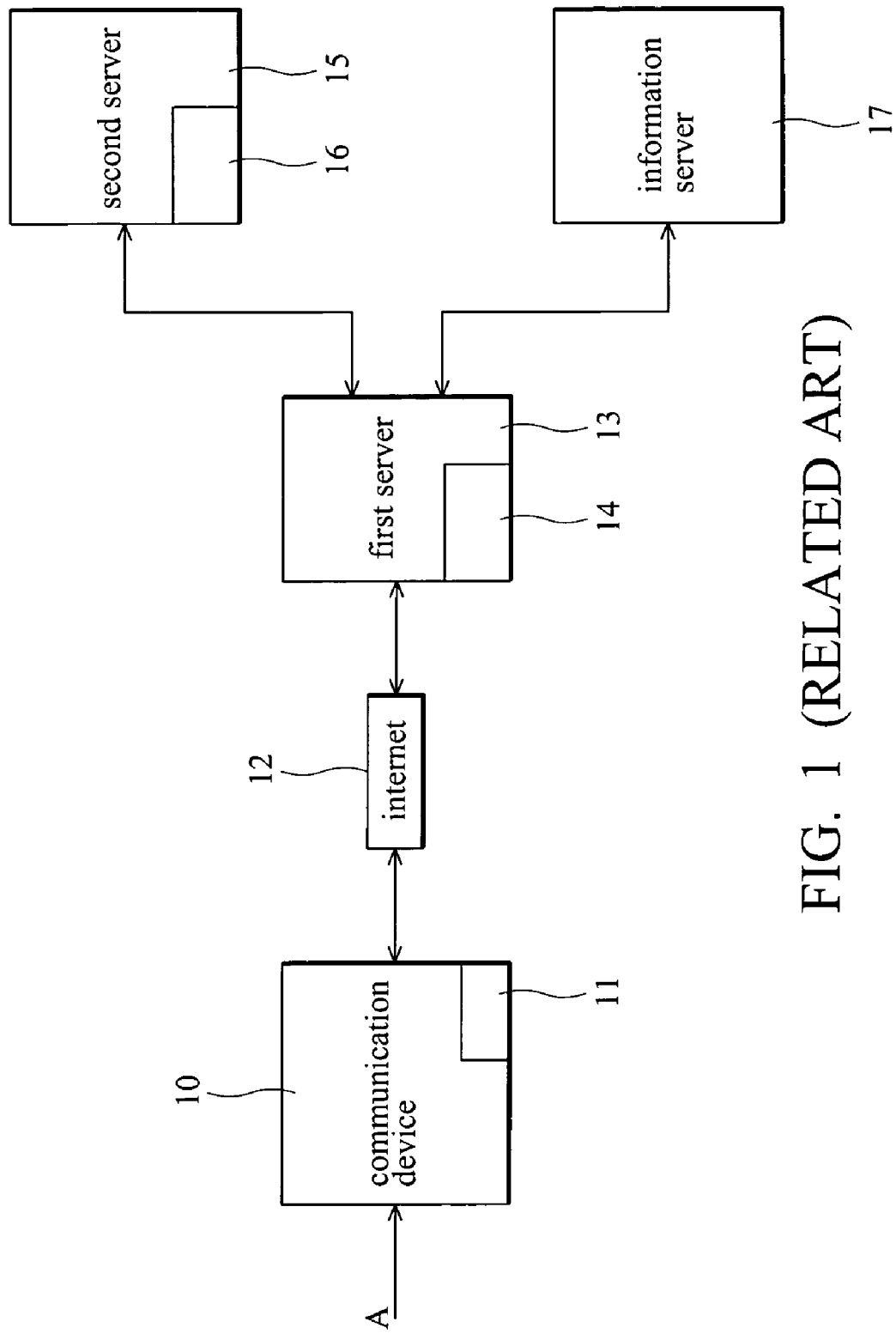
FIG. 1 is a schematic view of a conventional communication device upgrading system.
Figure 2:
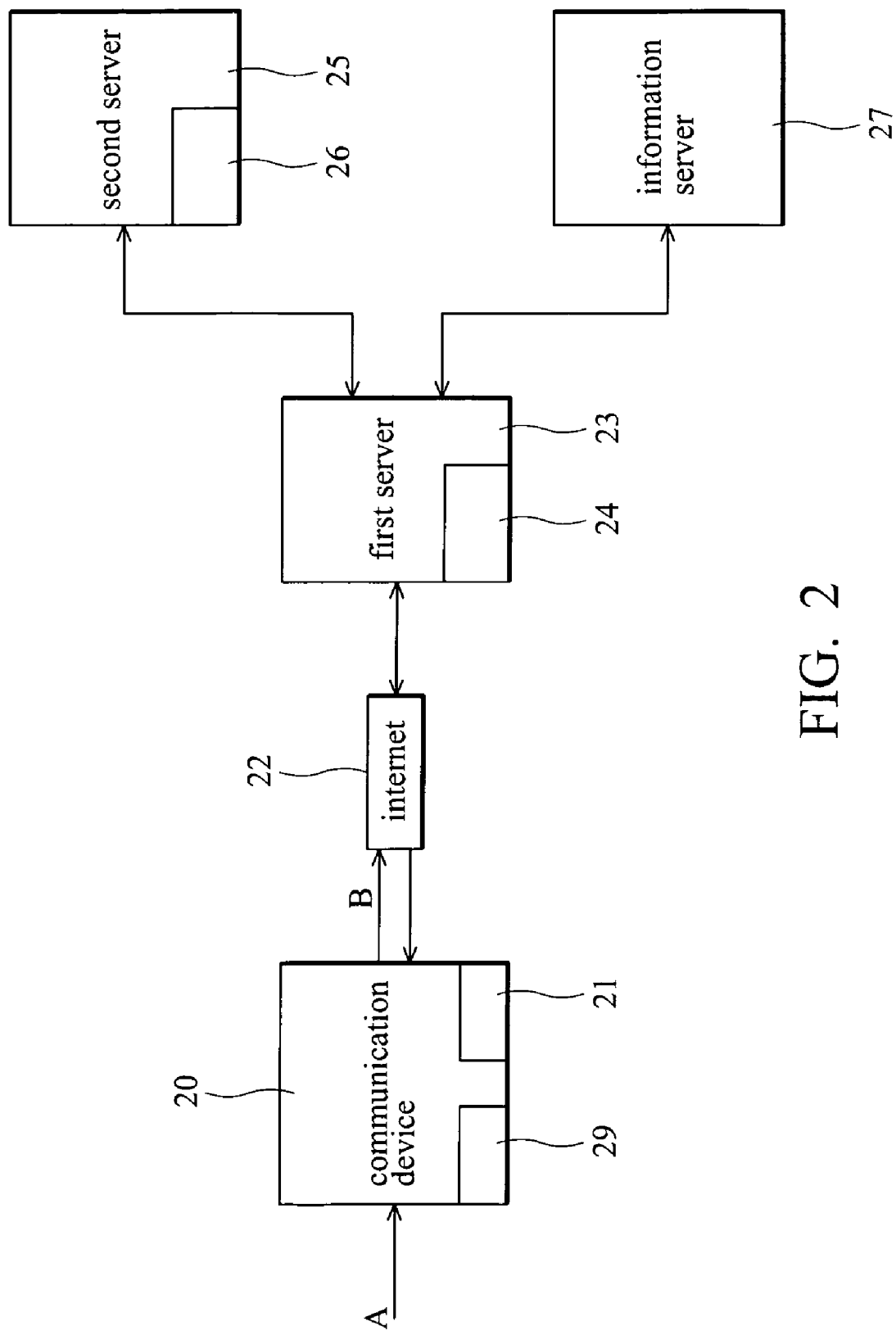
FIG. 2 is a schematic view of a communication device capabilities management system.

FIG. 2 illustrates a communication device capabilities management system comprising a communication device 20, a first server 23, a second server 25 and an information server 27 according to the embodiment of the invention. Communication device 20 can be a portable device, such as a cellular phone or a PDA.

Communication device 20 has a capability management agent 29. When the capabilities of communication device 20 are updated, capability management agent 29 can generate an information update B corresponding to communication device 20 according to software install information A of the software. Updating communication device 20 means adding/ updating software and/or adding pluggable accessories. Software install information A can be the descriptor of the software or the driver of the pluggable accessory for describing the media support/processing capabilities thereof. Information update B can be the UAProf-Diff generated by capability management agent 29 according to the descriptor or the driver.

It should be noted that UAProf-Diff can be the information describing difference between various types of communication devices of the same brand pre-stored in the communication device when fabricated. However, not all of the communication devices have a pre-stored UAProf-Diff when fabricated. Whether a communication device has a UAProf-Diff or not depends on the manufacturer.

Furthermore, in one embodiment of the invention, if communication device 20 has a UAProf-Diff, capability management agent 29 adds a field or updates the field in the UAProf corresponding to the software or the pluggable accessory according to the capability thereof for correctly describing the capabilities of communication device 20.

In addition, in one embodiment of the invention, if communication device 20 does not have a UAProf-Diff, capability management agent 29 can generate a UAProf-Diff according to the descriptor of the software or the driver of the pluggable accessory. Capability management agent 29 also adds a field in UAProf-Diff corresponding to the software or the pluggable accessory to correctly describe the capabilities of communication device 20.

When a user surfs the internet, a built-in browser 21 of communication device 20 has to transfer the URL of the UAProf and the UAProf-Diff to first server 23 through Internet 22. Most first servers 23 are set up by Telecommunication Company for providing services to users, such as Chunghwa Telecom (Taiwan), Vodafone (UK), and China Mobile (China). In addition, surfing Internet 22 can be through physical network or wireless network. In one embodiment of the invention, when a UAProf corresponding to a user is already stored in database 24 of first server 23, UAProf stored in database 24 can be compared with the UAProf-Diff received by first server 23, to update UAProf in database 24 to correctly describe the capabilities of communication device 20, and then store the updated UAProf in database 24.

In another embodiment of the invention, if the UAProf corresponding to URL of the UAProf of the user is not stored in database 24 of first server 23, first server 23 will send a request to second server 25 for the content of the UAProf corresponding to the URL of the UAProf of the user. In addition, first server 23 will compare the UAProf with the UAProf-Diff to update the UAProf for correctly describing the capabilities of communication device 20. Second server 25 can be configured by the manufacturer of communication device 20, such as Motorola or Nokia. The UAProf describing the capabilities of communication device 20 when fabricated can be stored in database 26 of second server 25. For the sake of performance, the correct UAProf of the user is stored in database 24 of first server 23, to reduce the time required to send a request to second server 25 for the UAProf content.

With the correct UAProf, when a user surfs the internet through built-in browser 21 of communication device 20, information server 27, based on the UAProf stored in database 24 of first server 23, can determine whether to send the information to communication device 20 directly, or to transform the format of the information before sending it to communication device 20, for correctly processing the information. Information server 27 can provide information such as web pages, files and data. Contents of information server 27 can be updated by software vendors, and the information provided by information server 27 can be free to downloaded or pay-per-download.

It should be noted that in some embodiments first server 23, second server 25 and information server 27 are set up by Telecommunication Company, manufacturers and software vendors, respectively. First server 23, second server 25 and information server 27 are not limited to position in separate hosts. In one embodiment of the invention, first server 23 and information server 27 can share the same host, also, first server 23 and second server 25 can share the same host, second-server 25 and information server 27 can share the same host, or first server 23, second server 25 and information server 27 can share the same host.

Figure 3:
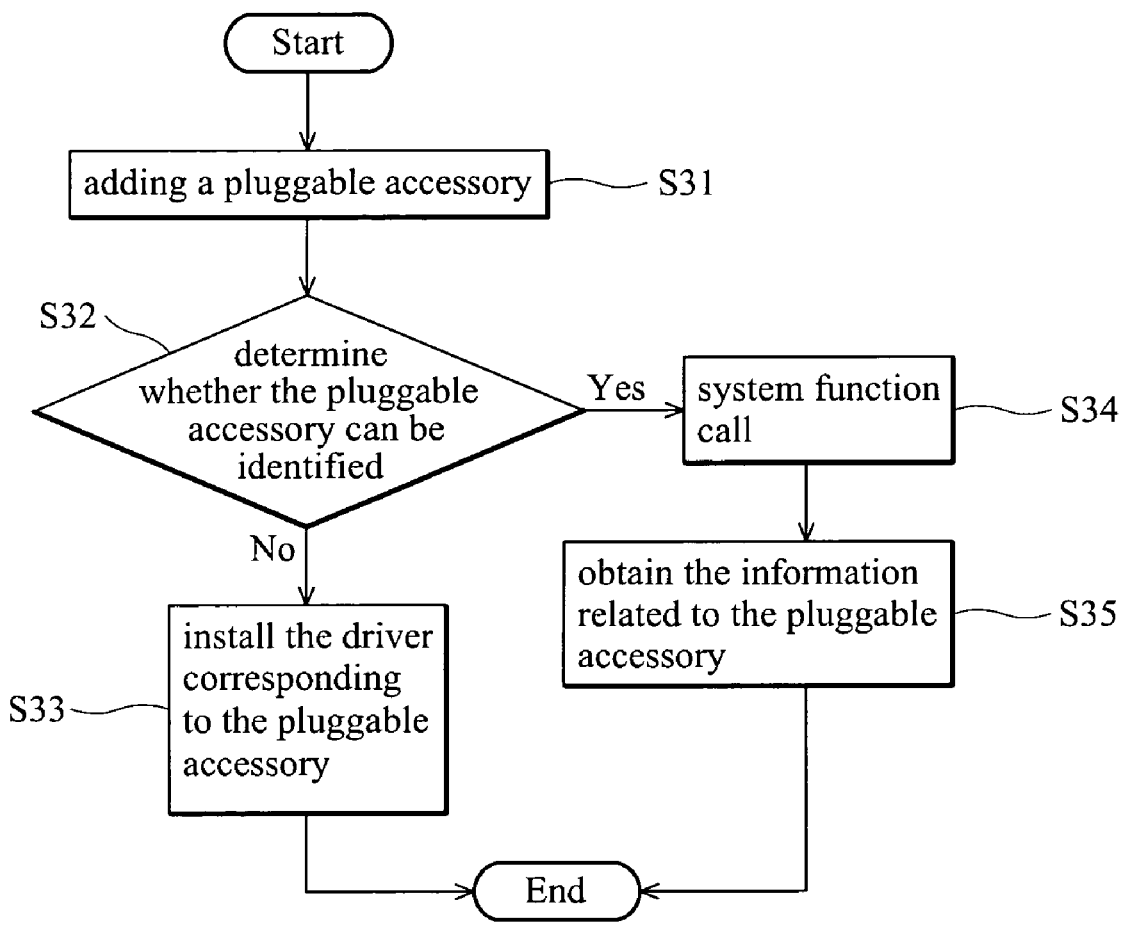
FIG. 3 is a flow chart showing the addition of a new pluggable accessory.

FIG. 3 illustrates a flow chart of updating the pluggable accessory. First, adding the pluggable accessory such as a camera module, a TV receiver, or a portable keyboard is added to communication device 20 (S31). The pluggable accessory can be plugged into the expended slot directly, connected to communication device 20 through a wired line or connected to communication device 20 wirelessly (such as Bluetooth and IrDA). IrDA is a kind of point-to-point transmission technique defined by Infrared Data Association. Next, it is determined whether the communication device 20 can identify the pluggable accessory (S32). If communication device 20 can identify the pluggable accessory, the driver of the pluggable accessory has been installed, Capability management agent 29 of communication device 20 can then execute a system function call (S34) to obtain the correlation information of the pluggable accessory (S35). Further, if the pluggable accessory can not be identified by communication device 20, installation of the driver of the pluggable accessory may be required (S33). The process to install driver of the pluggable accessory is the same as adding software described on next paragraph.

Figure 4:
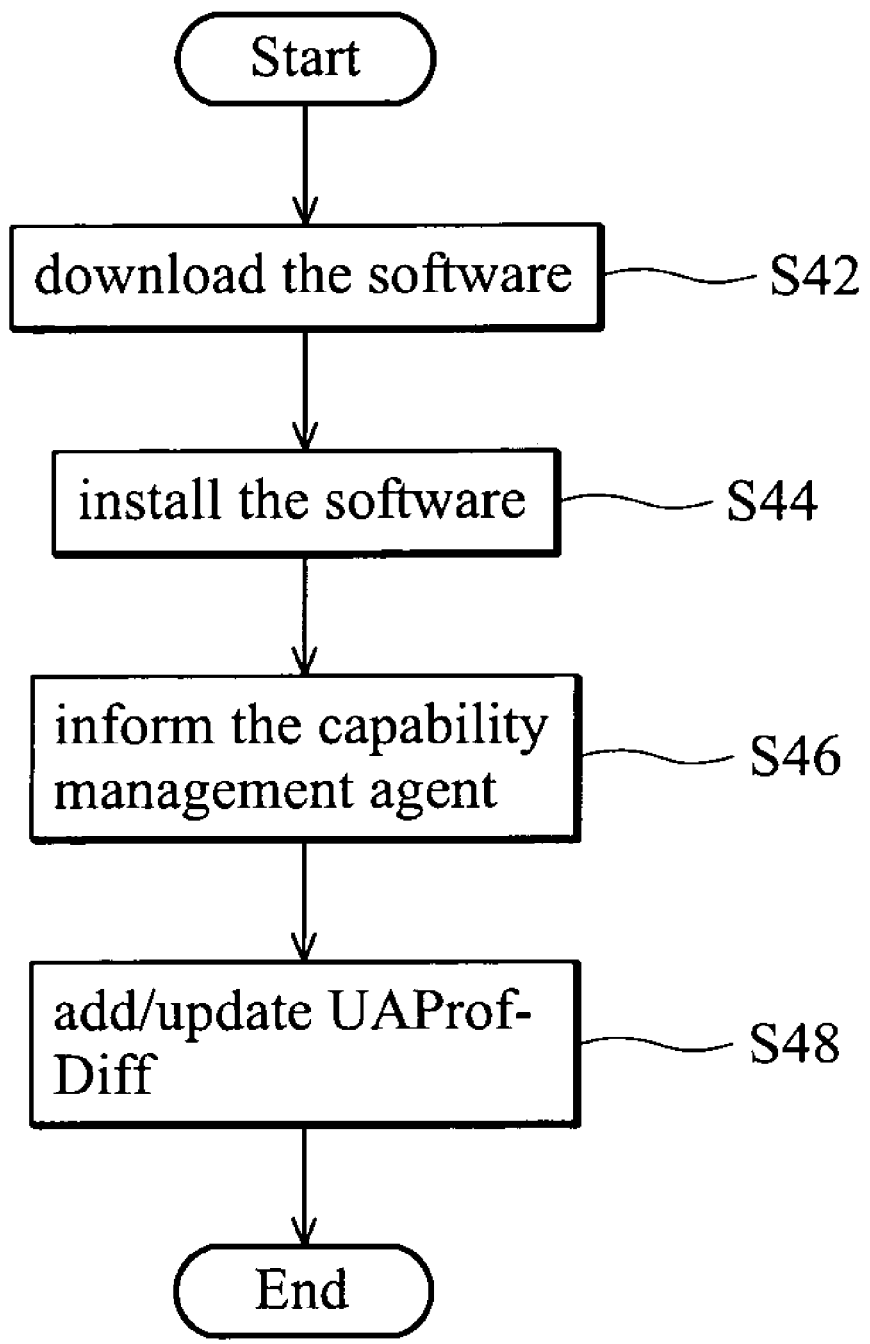
FIG. 4 is a flow chart of adding or updating software.

FIG. 4 illustrates step S33 of an embodiment of the invention, the detailed steps of adding/updating software. First, the user obtains software through wired or wireless method by a download agent of communication device 20 (S42). Next, the user installs the downloaded software (S44). The download agent can comprise any applicable transmission medium, such as a browser, e-mail, multimedia message service (MMS) or file transfer protocol (FTP). A software descriptor accompanies the software being downloaded to describe the media supporting/processing capabilities of the software, and software installation information A can be stored in the software or saved as an additional file, such as a software descriptor file. The format of software installation information A is not limited to a specific format. In one embodiment of the present invention, the content of software installation information A comprises information such as name, version, software vendor and capabilities of the applications.

Software installation information A can be discovered periodically by capability management agent 29. Also, capability management agent 29 can be informed through system function call after the download agent has downloaded and installed the software, then software installation information A can be discovered. A method for capability management agent 29 to actively discover software installation information A is to store software installation information A in the designated data path or the memory via the download agent. Software installation information A is processed by capability management agent 29 when a specific event occurs (such as a particular time, a user initiation or a software event) (S46). Capability management agent 29 can add a field to the UAProf-Diff or update the fields of the UAProf-Diff based on software installation information A.

If the UAProf-Diff is stored in communication device 20, capability management agent 29 can update the UAProf-Diff based on software installation information A to correctly describe the capabilities of communication device 20 in accordance with one embodiment of the invention.

In addition, if the UAProf-Diff is not stored in communication device 20, capability management agent 29 can generate the UAProf-Diff according to software installation information A in accordance with another embodiment of the invention. Capability management agent 29 also generates fields corresponding to software installation information A for correctly representing the capabilities of communication device 20.

Figure 5:
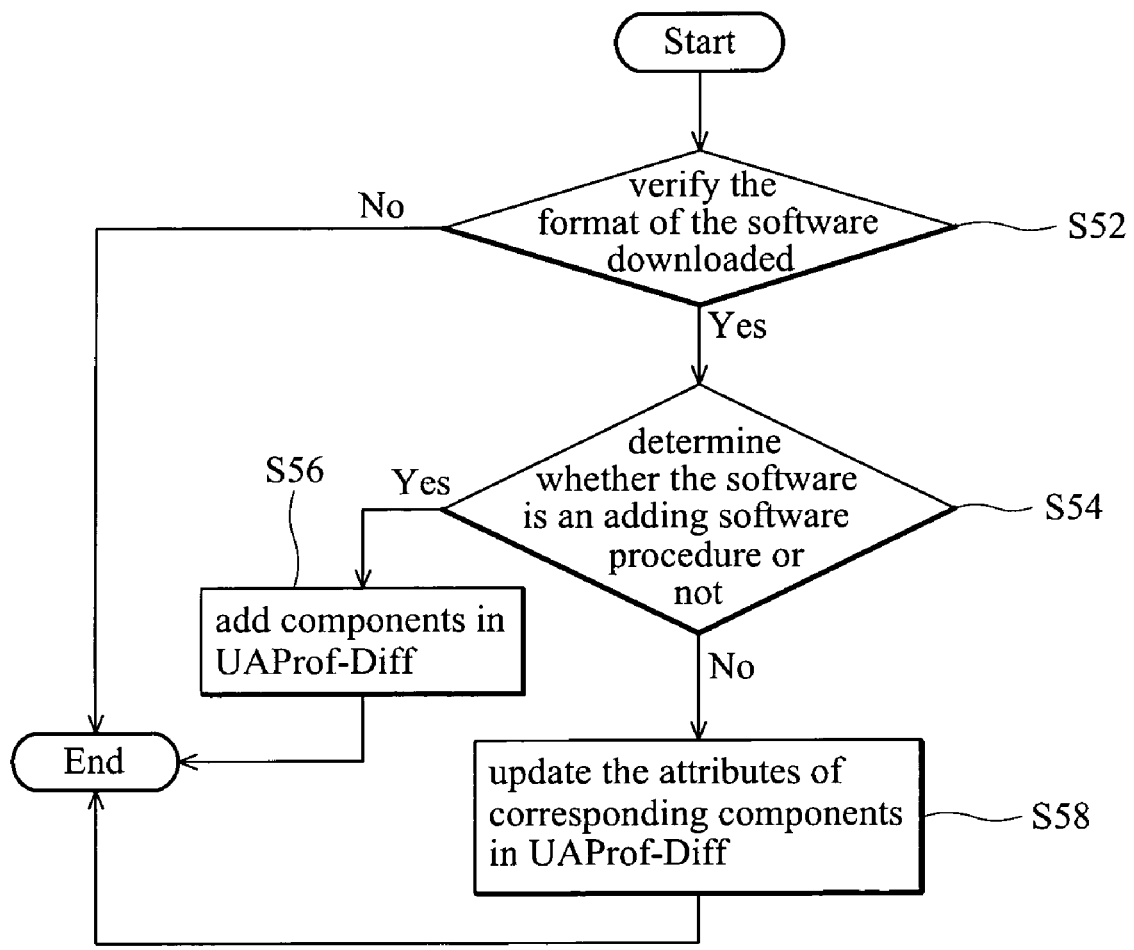
FIG. 5 is a flow chart of adding or updating the UAProf-Diff.

FIG. 5 illustrates the steps for adding/updating the UAProf-Diff. First, communication device 20 verifies the format of software installation information A downloaded by the download agent (S52). It should be noted that, step S52 is an optional step. If the format of software installation information A does not meet the criteria of the self-defined or the standard UAProf, then the UAProf is neither updated nor modified from UAProf or UAProf-Diff. If the format of software installation information A meets the criteria of the standard UAProf, then it is further decided if the properties of the downloaded software to be newly added software or updated software (S54). If the downloaded software is new software the new component/attribute fields are added to the UAProf-Diff based on software installation information A (S56). When the downloaded software is updated software, the component/attribute fields are added according to software installation information A, if corresponding component/attribute fields are not presented in the UAProf-Diff, or updating component/attribute fields are updated according to software installation information A, if corresponding component/attribute fields are presented in the UAProf-Diff (S58).

As previously described above, in one embodiment of present invention, capability management agent 29 dynamically discovers the update information of communication device 20, and actively transfers information update of communication device 20 to first server 23 when connecting to the Internet to provide the proper information to communication device 20 according to UAProf stored in database 24.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for discovering capabilities of a communication device, comprising:
   updating the capabilities of the communication device;
   generating update information corresponding to the updated capabilities by the communication device;
   transferring a URL of a user agent profile and the update information of the communication device to a first server when the communication device is connected to an Internet;
   requesting the user agent profile according to the URL from a second server by the first server;
   updating the user agent profile according to the original user agent profile and the update information of the communication device by the first server; and
   storing the updated user agent profile in a database of the first server,
   wherein the update information is user agent difference profile describing the difference of the capabilities of the communication device before and after updating the capabilities of the communication device.

2. The method for discovering capabilities of the communication device as claimed in claim 1, wherein updating the capabilities of the communication device comprises adding software, updating software, or adding pluggable accessories.

3. The method for discovering capabilities of the communication device as claimed in claim 1, wherein the user agent difference profile is generated by a capability management agent.

4. The method for discovering capabilities of the communication device as claimed in claim 3, wherein the capability management agent is installed in the communication device.

5. The method for discovering capabilities of the communication device as claimed in claim 1, wherein the capabilities of the communication device are updated through a download agent.

6. The method for discovering capabilities of the communication device as claimed in claim 5, wherein the capability management agent is informed through a system function call after downloading software via the download agent.

7. The method for discovering capabilities of the communication device as claimed in claim 5, wherein the downloaded software is stored in a specific data path or a memory, and is one time or batch processed by the capability management agent when designated event occurs.

8. The method for discovering capabilities of the communication device as claimed in claim 1, wherein the first server is set up by Telecommunications Company which provides services to users.

9. The method for discovering capabilities of the communication device as claimed in claim 1, wherein the communication device is connected to the first server by through wired or wireless method.

10. The method for discovering capabilities of the communication device as claimed in claim 1, wherein most of the second servers are set up by a manufacturer of the communication device.

11. The method for discovering capabilities of the communication device as claimed in claim 1, wherein the user agent profile is used for describing software/hardware capabilities of the communication device when fabricated.

12. The method for discovering capabilities of the communication device as claimed in claim 1, wherein storing the updated user agent profile is stored in a database of the first server to save time required to send a request to the second server for the content of the user agent profile by the first server.

13. The method for discovering capabilities of the communication device as claimed in claim 1, further comprises when a user searching for information through the internet, an information server may determine whether to send the information to the communication device or not according to the user agent profile stored in the database of the first server.

14. The method for discovering capabilities of the communication device as claimed in claim 13, wherein the information server provides the information such as web pages, files, or data.

15. A communication device capability management system, comprising:
   a communication device, comprising:
      a URL of a user agent profile for describing capabilities of the communication device;

a capability management agent generating an update information corresponding to the capabilities of the communication device after the capabilities of the communication device have been updated, and transferring the URL of the user agent profile and the update information when the communication device is connected to an Internet; and a download agent downloading software for updating the communication device, and a first server receiving the URL of the user agent profile and the update information from the communication device, sending a request to a second server for the user agent profile according to the URL of the user agent profile, and updating the user agent profile according to the original user agent profile and the update information, wherein the update information is a user agent difference profile corresponding to the difference before updating the communication device and after updating the communication device.

16. The communication device capability management system as claimed in claim 15, wherein the URL of the user agent profile is stored in the communication device.

17. The communication device capability management system as claimed in claim 16, wherein the URL of the user agent profile corresponds to the user agent profile of the capabilities of the communication device stored in the second server.

18. The communication device capability management system as claimed in claim 15, wherein updating the communication device comprises at least one of adding software, updating software and adding pluggable accessories.

19. The communication device capability management system as claimed in claim 15, wherein after the software is downloaded by the download agent, the capability management agent is informed by a system function call.

20. The communication device capability management system as claimed in claim 15, wherein after the software is downloaded by the download agent, the software can be stored in a predetermined data path or a memory, and processed one or more at a time by the capability management agent when a predetermined event occurs.

21. The communication device capability management system as claimed in claim 15, wherein most of the first servers are set up by Telecommunications Company which provides services to users.

22. The communication device capability management system as claimed in claim 15, wherein the communication device is connected to an Internet through wired or wireless method.

23. The communication device capability management system as claimed in claim 15, wherein most of the second servers are set up by a communication device manufacturer.

24. The communication device capability management system as claimed in claim 15, wherein the user agent profile is used for describing the software/hardware capabilities of the communication device when fabricated.

25. The communication device capability management system as claimed in claim 15, wherein the updated user agent profile is stored in the first server is to save time required to send a request to the second server for a content of the user agent profile.

26. The communication device capability management system as claimed in claim 15, further comprises an information server providing information of web pages, files, or data.

27. The communication device capability management system as claimed in claim 26, wherein when the communication device searches the information through the Internet, the information server determines whether to send the information to the communication device according to the user agent profile stored in the first server.

* * * * *